Aug. 8, 1961　　　L. BALDAUF ET AL　　　2,995,506
FUEL ROD CARRIAGE FOR NUCLEAR REACTORS
Filed April 23, 1959　　　　　　　　　　　3 Sheets-Sheet 1

INVENTORS
Ludwig Baldauf
Friedrich Bundschuh

BY Bailey, Stephens & Huettig
ATTORNEYS

INVENTORS
Ludwig Baldauf
Friedrich Bundschuh

United States Patent Office 2,995,506
Patented Aug. 8, 1961

2,995,506
FUEL ROD CARRIAGE FOR NUCLEAR REACTORS
Ludwig Baldauf, Gustavsburg, and Friedrich Bundschuh, Mainz, Germany, assignors to Maschinenfabrik Augsburg-Nurnberg A.G., Nurnberg, Germany
Filed Apr. 23, 1959, Ser. No. 808,366
Claims priority, application Germany Apr. 23, 1958
9 Claims. (Cl. 204—193.2)

This invention relates to a fuel rod carriage for nuclear reactors. In particular, the invention is directed to the construction of a fuel rod carriage for inserting and removing fuel elements from a reactor core.

A nuclear reactor fuel rod carriage is composed of a lower carriage frame running on track rails on the sides of the reactor and an upper carriage frame mounted for transverse movement on the lower frame. This carriage is for transporting rods holding the fuel slugs in containers and for inserting the fuel elements into the channel holes in the nuclear core. Ordinarily, the core is a right cylinder, and the core openings must be approached with the greatest possible accuracy. Each carriage frame is provided with driving means so each channel opening can be approached within an accuracy of, for example, ±15 mm. The exact alignment of the rod held fuel container with respect to a channel opening is accomplished by a complicated and slow adjustment of the carriage frame.

The object of this invention is to produce a mechanism by which the final alignment of the carriage frames with respect to the core channel openings can be quickly effected.

In this invention, the upper and lower carriage frames are each provided with power driven pins having conical lower ends. These pins engage holes in perforated bars in which the bar holes correspond with the channel openings in the reactor core. A separate perforated bar is provided for the upper and lower carriage frames, respectively. Each pin is preferably driven by a motor through a rack and pinion with cam means provided for limiting the extent of movement of each pin in either of its directions of travel.

The fuel rods are carried by the upper carriage frame; and when the fuel rods have been moved by the carriage to within about 15 mm. of a channel opening in the core, the pins are actuated so that the conical ends engage the holes in the perforated bar which will then draw the upper and lower frames, respectively, into position so that the fuel rod is exactly aligned with or coaxial with the corresponding channel opening in the core. Preferably, the lower carriage frame has a pin mounted on each side end of the carriage. If the upper carriage frame has a wide track gauge, two pins are used and only one pin is used for a narrow track gauge provided that the wheels for the upper frame are properly guided.

A further feature of the invention provides a mechanical or electrical counter for the upper and lower carriage frame for continuously indicating the position of the pin or pins with respect to the holes in the perforated bars in the openings in the reactor core. The counter is operated by a sensing member or roller which is resiliently pressed against the respective perforated bar and displaced in passing over a hole in the bar. This counter aids the carriage operator as he moves the carriage to the desired core opening and stops the carriage for making the final adjustment by actuating the pins.

The means by which the objects of the invention are obtained are described more fully with reference to the accompanying drawings, in which.

Figure 1:
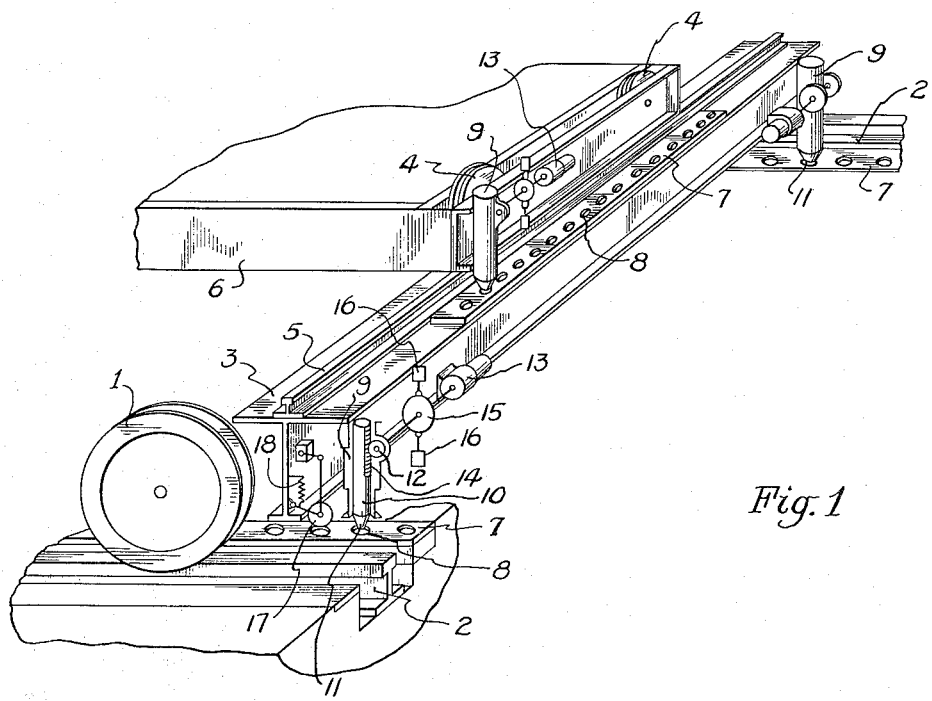
FIGURE 1 is a perspective view of a fuel rod carriage according to this invention.

In FIGURE 1, wheels 1 ride on rails 2 mounted along the upper edge of the reactor tank. These wheels are journalled to a lower carriage frame or bridge 3. Wheels 4 ride on the track rails 5 mounted on the frame 3, these wheels being journalled to the upper carriage frame 6 for moving the upper frame transversely of the movement of the lower frame. The fuel rods are carried by upper frame 6 in order to be transported to and from the reactor core channel openings.

Motors, not shown, are provided for moving the upper and lower carriage frames to their approximate aligned position with a respective core opening, so that the carriage can be moved rapidly to within about 15 mm. of its final position. The final and exact position of the carriage frames is obtained by the use of special aligning pins.

Parallel to each of the rails 2 of lower frame 3 and to the rails 5 for upper frame 6, respectively, are perforated bars 7 having holes 8. Casings 9 secured to the upper and lower frames, respectively, contain slidable pins 10 having lower conical ends 11. The distance between the holes 8 in bars 10 is the same as that between the channel openings in the reactor core.

The upper portions of the holes 8 are beveled at 8a in order to facilitate the entry of the conical ends 11 into the holes. As shown, a pair of pins is provided for lower frame 3 and only one pin provided for upper frame 6.

Each pin is moved by means of a rack and pinion 12 connected by a shaft to a gear motor 13. A rack is formed directly on pin 10 by means of the teeth 14 cut in the pin. The length of movement of pin 10 is limited by means of a cam 15 mounted on the motor shaft which engages upper and lower end stops 16.

When pins 10 are driven downwardly by gear motor 13, the conical ends 11 engage the sides of the respective hole 8 and pull the respective frame into final adjusted position as the pins center themselves in the holes. Thus, the position of the fuel rod on carriage 6 is brought into exact alignment with the desired reactor core opening. Each carriage frame is exactly positioned.

In order to safely and effectively operate the carriage to position the same, indicating devices are actuated by the carriage for showing the position of the carriage at the operator's control station.

A sensing member composed of a roller 17 is attached to each frame near a pin 10. Each roller is separated from its respective pin by the space between two adjacent holes 8. As the corresponding carriage moves, this roller is pressed by a spring 18 into the holes 8 as it passes thereover. Roller 17 is thus given a vertical reciprocating motion in either the forward or reverse travel of the carriage. This movement is transmitted to a counter connected either mechanically or electrically to roller 17.

Figure 2:
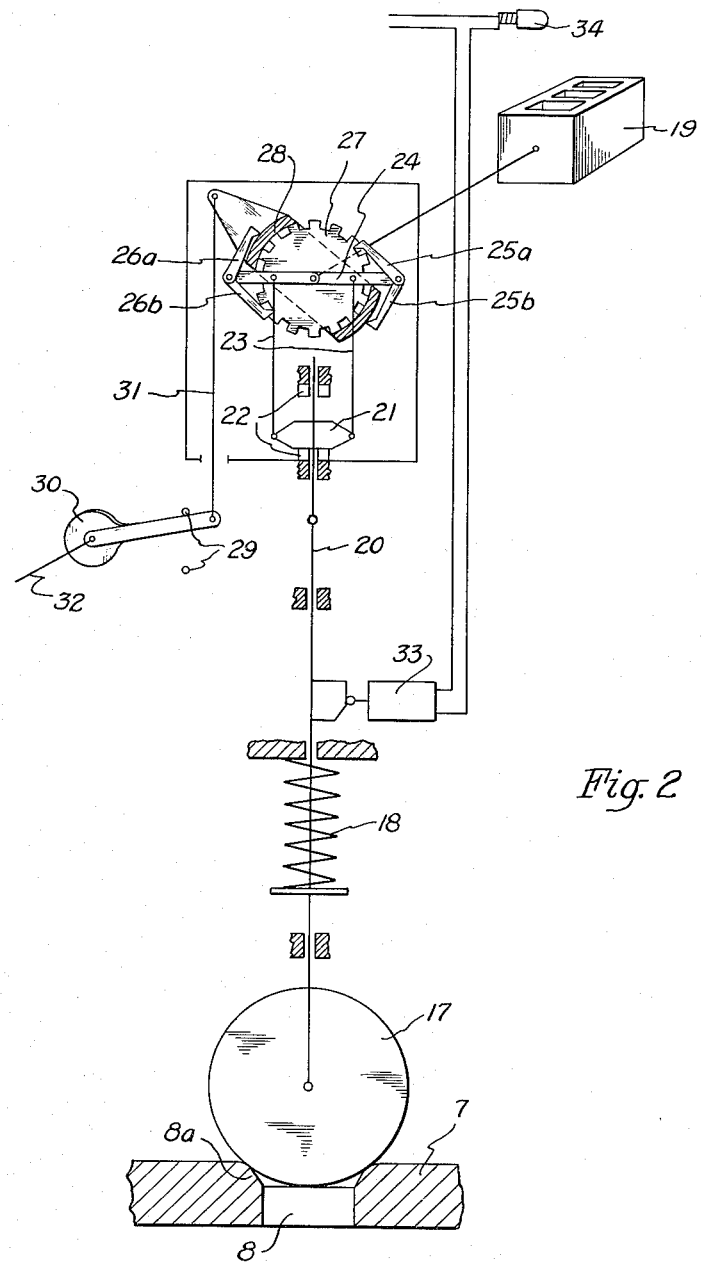
FIGURE 2 is a diagrammatic view of a mechanical counter for the carriage.

FIGURE 2 shows a mechanical counter. A vertically movable rod 20 connects roller 17 to a flange 21 which is movable between stops 22. Rods 23 join flange 22 to two levers 24 of a pawl and ratchet mechanism. Each lever 24 is connected to the arms 25a, 25b and 26a, 26b of the double pawls which engage ratchet wheel 27. The proper pawl is operated by a closed tooth sector 28 which is operated between stops 29 by means of a sliding clutch 30 connected to sector 28 by rod 31. The clutch is turned by shaft 32 joined to the carriage driving motor. In the position shown in FIGURE 2, ratchet wheel 27 is engaged by pawl arm 25a when roller 17 moves upward, and is engaged by pawl arm 26b when the roller 17 moves downward, so that the counter 19 connected to the ratchet wheel is advanced a half a digit by each movement, Thus counter 19 is advanced one digit each time roller 17 passes over one hole 8.

When the direction of travel of the carriage is reversed, the shaft 32 is reversed and the sliding clutch 30 with sector 28 are shifted so that pawls 25b and 26a are engaged. This causes a one digit subtraction in counter 19 for each movement of roller 17 across a hole 8. This operation shows in the counter one digit for each hole crossed by roller 17 so that the number of holes traversed by the carriage can be seen at any time. The lowest position of roller 17 as it rests in a hole is indicated through a switch 33 by a light 34.

Figure 3:
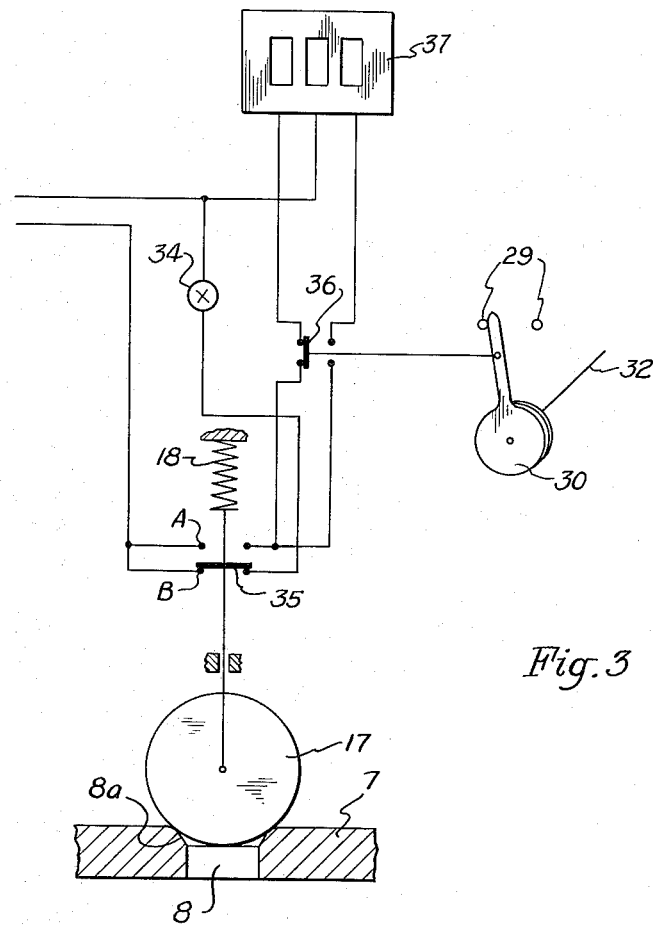
FIGURE 3 is a diagrammatic view of an electrical counter for the carriage.

An electrically actuated counter is shown in FIGURE 3. This also includes an indicating light 34. Roller 17 is joined to a two-way switch 35 engaging contact points A and B in an electrical circuit connected through a reversing switch to counter 37. One digit in the counter is either added or subtracted by the closing of either contact A or B, respectively.

The holes 8 in bar 7 may be provided with numerals to permit the accurate positioning of the carriage in the event of the failure of the indicating mechanism. Bars 7 are preferably removably mounted on the reactor tank and carriage frame, respectively.

Having now described the means by which the objects of the invention are obtained, we claim:

1. A fuel rod bridge carriage for a tank containing a nuclear reactor core having fuel channel openings therein comprising a lower carriage frame movable along the tank, an upper carriage frame mounted for transverse movement on said lower frame and for carrying a fuel rod, bars associated with the upper and lower frames and having openings corresponding to the channel openings in said reactor core, conically ended pins mounted on the upper and lower carriages, respectively and power means for actuating said pin to engage the conical ends in the opening in said bars for moving said frames to bring the fuel rod into alignment with an opening in the nuclear core.

2. A carriage as in claim 1, further comprising a conically ended pin on each side of said lower frame.

3. A carriage as in claim 1, further comprising a conically ended pin on each side of said upper frame.

4. A carriage as in claim 1, said power means comprising a motor, a rack and pinion gear interconnecting said pins and said motor, and cam operated stop means attached to said gear for limiting the movement of said pins.

5. A carriage as in claim 1, further comprising pin actuated counter means for indicating the fuel channel opening position of said pins.

6. A carriage as in claim 5, said counter means including sensing members resiliently pressed upon said bars and movable into and out of the holes in the bars.

7. A carriage as in claim 6, said counter means further including a reversible pawl and ratchet connected to said sensing member, and a counter joined to said pawl and ratchet.

8. A carriage as in claim 6, said counter means further including a two-way electrical switch actuated by said sensing member, a counter, and a reversing switch interconnected between said two-way switch and said counter.

9. A carriage as in claim 6, further comprising indicating light means joined to said sensing member for illumination when said sensing members move into said holes.

References Cited in the file of this patent
UNITED STATES PATENTS

| | | |
|---|---|---|
| 2,813,070 | Fermi et al. | Nov. 12, 1957 |
| 2,848,404 | Treshow | Aug. 19, 1958 |